(No Model.)
J. McALLISTER.
OFFSETTING DEVICE FOR SAWMILL CARRIAGES.
No. 510,042. Patented Dec. 5, 1893.
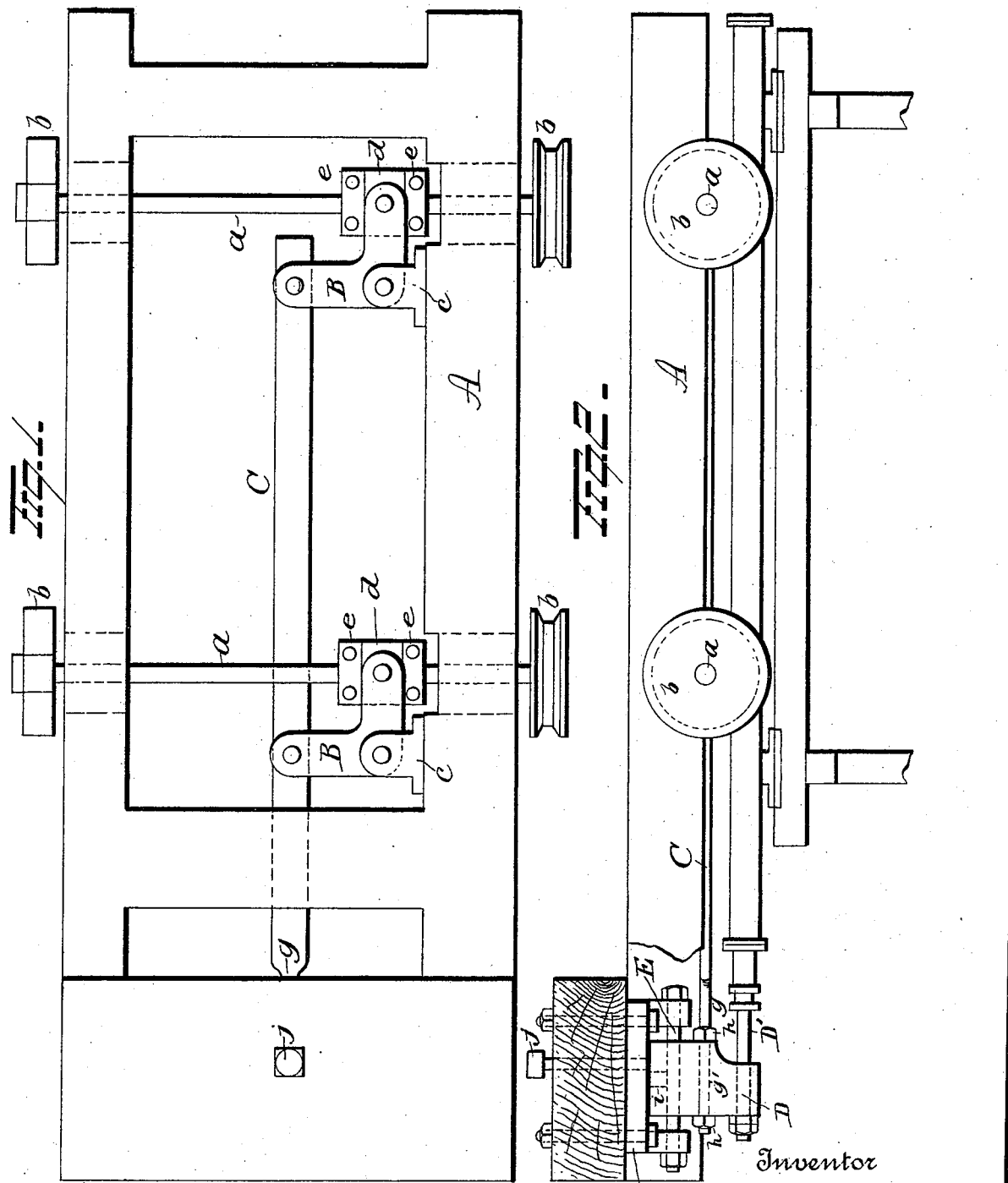
Witnesses
G. F. Downing
V. E. Hodges
Inventor
J. McAllister
By H. A. Seymour
Attorney

United States Patent Office.

JAMES McALLISTER, OF SOUTH MANISTIQUE, MICHIGAN, ASSIGNOR OF ONE-HALF TO A. C. HUBBELL, OF SAME PLACE.

OFFSETTING DEVICE FOR SAWMILL-CARRIAGES.

SPECIFICATION forming part of Letters Patent No. 510,042, dated December 5, 1893.

Application filed August 12, 1893. Serial No. 482,997. (No model.)

*To all whom it may concern:*

Be it known that I, JAMES MCALLISTER, a citizen of South Manistique, in the county of Schoolcraft and State of Michigan, have invented certain new and useful Improvements in Offsetting Devices for Sawmill-Carriages; and I do hereby declare the following to be a full, clear, and exact description of the invention, such as will enable others skilled in the art to which it appertains to make and use the same.

My invention relates to an improvement in offsetting devices for saw mills,—the object of the invention being to produce devices of the class specified, which will be simple in construction, capable of quick action, which shall be cheap to manufacture, easy to apply and which shall be effectual in the performance of their functions.

With this object in view the invention consists in certain novel features of construction and combinations and arrangements of parts as hereinafter set forth and pointed out in the claims.

Figure 1 of the accompanying drawings illustrates an embodiment of my invention. Fig. 2 is a side view.

A represents a saw mill carriage, in which shafts $a$, $a$ are mounted, and at their ends these shafts carry wheels $b$ adapted to run on suitable tracks in the usual manner. Brackets $c$ are secured to the carriage in proximity to the axles or shafts $a$ at the ends of the carriage, and to these brackets, bell-crank-levers B are pivoted. One arm of each bell-crank-lever is bifurcated and adapted to partially embrace a collar $d$ loosely mounted on the shafts or axles $a$, to which collars said bell-crank-levers are pivotally connected.

In order to retain the collars $d$ in proper position on the shaft, collars $e$ are secured to said shafts or axles at each side of the loose collars $d$. The other arm of each bell-crank-lever is also bifurcated for the accommodation of a connecting bar C, which is pivotally connected to both levers. One end of the connecting bar or rod C is made with a contracted end $g$ adapted to pass through a perforation $g'$, in the steam feed cross head D, said connected rod or bar being retained in place by means of nuts $h$, $h$. By thus connecting the rod or bar C with the cross head it may be adjusted relatively thereto. The cross head D has the steam feed rod D' connected to it, and said cross head is adapted to have a sliding movement on a rod or shaft E, secured to a bracket F, which latter is rigidly secured to the carriage A. The cross head D is made with a socket $i$, for the reception of a pin $j$ passing through the bracket F, whereby to lock the cross head to the bracket and prevent the former from sliding when it is desired that the off-setting devices shall not operate.

From the construction and arrangement of parts above described it will be seen that when the feeding devices commence to move, the first movement of the cross head D will be to slide from one end to the other of the bracket F, thus moving the connecting rod or bar C. This movement of the connection rod or bar will cause the bell-crank-levers to turn on their fulcrums and thus cause the carriage to be moved laterally or be off-set. It is evident that at the end of each movement of the carriage, the devices will be operated as above described to off-set it.

My improvements are very simple in construction, and are very effectual, in every respect, in the performance of their functions.

Various slight changes might be made in the details of construction of my invention without departing from the spirit thereof or limiting its scope and hence I do not wish to limit myself to the precise details of construction herein set forth; but, Having fully described my invention, what I claim as new, and desire to secure by Letters Patent, is—

1. The combination with a saw mill carriage and axles, of a bracket secured to the carriage, a rod passing through the arms of said bracket, a cross head of the feed mechanism mounted on said rod and adapted to slide from end to end of the bracket, bell crank levers pivotally connected to the carriage and to the axles, a connecting bar pivotally connected to said bell crank levers and connected to the cross head, and means for locking said cross head, substantially as set forth.

2. The combination with a saw mill carriage and axles, of a bracket secured to the carriage, a rod passing through the arms of said bracket, a cross head of the feed mechanism mounted on said rod and adapted to slide from end to end of said bracket, said cross head having a socket therein, a pin adapted to pass through said bracket and enter said socket, bell crank levers pivotally connected to the carriage and to the axles, and a rod connected to the cross head and pivotally connected to said bell crank levers, substantially as set forth.

In testimony whereof I have signed this specification in the presence of two subscribing witnesses.

JAMES McALLISTER.

Witnesses:
 A. C. HUBBELL,
 ERNEST LE DUC.